US011275234B2

(12) United States Patent
Aikio

(10) Patent No.: US 11,275,234 B2
(45) Date of Patent: Mar. 15, 2022

(54) PROJECTION OBJECTIVE AND WAVEGUIDE DISPLAY DEVICE

(71) Applicant: Dispelix Oy, Espoo (FI)

(72) Inventor: Mika Aikio, Espoo (FI)

(73) Assignee: Dispelix Oy, Espoo (FI)

(*) Notice: Subject to any disclaimer, the term of this patent is extended or adjusted under 35 U.S.C. 154(b) by 175 days.

(21) Appl. No.: 16/618,184

(22) PCT Filed: May 18, 2018

(86) PCT No.: PCT/FI2018/050370
§ 371 (c)(1),
(2) Date: Nov. 29, 2019

(87) PCT Pub. No.: WO2018/220265
PCT Pub. Date: Dec. 6, 2018

(65) Prior Publication Data
US 2021/0157108 A1 May 27, 2021

(30) Foreign Application Priority Data
Jun. 2, 2017 (FI) .................................. 20175508

(51) Int. Cl.
*G02B 13/16* (2006.01)
*G02B 9/30* (2006.01)
(Continued)

(52) U.S. Cl.
CPC .............. *G02B 13/16* (2013.01); *G02B 9/30* (2013.01); *G02B 13/006* (2013.01); *G02B 13/0035* (2013.01); *G02B 27/0172* (2013.01)

(58) Field of Classification Search
CPC ...... G02B 13/16; G02B 9/30; G02B 13/0035; G02B 13/006; G02B 27/0172;
(Continued)

(56) References Cited

U.S. PATENT DOCUMENTS 7,453,654 B2  11/2008  Shinohara
7,502,181 B2   3/2009  Shinohara
(Continued)

FOREIGN PATENT DOCUMENTS

CN   101907771 A   2/2010
CN   102967923 A   3/2013
(Continued)

OTHER PUBLICATIONS

Bian et al: Design of Ultra-Short Throw Ratio Projection Lens. State Key Laboratory of Modern Optical Instrumentation, Zhejiang University, Hangzhou, Zhejiang 310027, China, Dec. 2015, vol. 35, No. 12.
(Continued)

*Primary Examiner* — Thomas K Pham
*Assistant Examiner* — Henry A Duong
(74) *Attorney, Agent, or Firm* — Laine IP Oy

(57) ABSTRACT

The invention concerns a projection objective and a waveguide display. The objective is adapted to project an image from a first plane to a second plane and comprises in order from the second plane a first optical element group having a positive effective focal length, a second optical element group placed between the first plane and the first optical element group and having a negative effective focal length, and a third optical element group placed between the first plane and the second optical element group and having a positive effective focal length. Counting from the second plane, the first refractive surface of the second optical element group is concave towards the second plane and the second refractive surface of the third optical element group is convex towards the first plane. The objective suits well for projecting images to diffractive optical displays.

16 Claims, 4 Drawing Sheets

(51) Int. Cl.
*G02B 13/00* (2006.01)
*G02B 27/01* (2006.01)

(58) Field of Classification Search
CPC .. G02B 13/24; G02B 9/16; G02B 2027/0174; G02B 27/0081; G02B 13/22; G02B 5/1814; G02B 6/0016; G02B 9/14; G02B 27/4272; G02B 27/01; G02B 27/0101; G02B 27/0103; G02B 27/0149; G02B 27/017; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0178; G02B 2027/0181; G02B 2027/0183; G02B 2027/0185; G02B 2027/0187; G02B 2027/019; G02B 2027/0192; G02B 2027/0194; G02B 2027/0196; G02B 2027/0198
USPC .......................................................... 359/630
See application file for complete search history.

(56) References Cited

U.S. PATENT DOCUMENTS

| | | | |
|---|---|---|---|
| 7,826,151 | B2 | 11/2010 | Tsai |
| 7,965,455 | B2 | 6/2011 | Okano |
| 8,035,723 | B2 | 10/2011 | Sano et al. |
| 8,953,262 | B2 | 2/2015 | Lee |
| 2004/0085649 | A1 | 5/2004 | Repetto et al. |
| 2007/0153395 | A1 | 7/2007 | Repetto et al. |
| 2007/0188837 | A1 | 8/2007 | Shimizu et al. |
| 2008/0198353 | A1 | 8/2008 | Dodoc et al. |
| 2010/0246003 | A1 | 9/2010 | Simmonds et al. |
| 2013/0070344 | A1 | 3/2013 | Takeda et al. |
| 2016/0327852 | A1 | 11/2016 | Watanabe et al. |
| 2017/0131545 | A1 | 5/2017 | Wall et al. |
| 2018/0314043 | A1* | 11/2018 | Ichikawa ............... G02B 13/16 |

FOREIGN PATENT DOCUMENTS

| | | | |
|---|---|---|---|
| CN | 104238092 A | | 12/2014 |
| CN | 104614857 A | | 5/2015 |
| DE | 102007022218 A1 | | 11/2008 |
| DE | 102007051893 A1 | | 5/2009 |
| JP | 2007240924 A | | 9/2007 |
| RU | 162200 U1 | | 5/2016 |
| WO | WO2006005547 A1 | | 1/2006 |
| WO | WO2009077774 A1 | | 6/2009 |
| WO | WO2016179246 A1 | | 11/2016 |
| WO | WO-2016194112 A1 * | 12/2016 | ............... G02B 9/64 |

OTHER PUBLICATIONS

Dwivedi: Design and evaluation of laser spot illuminator for a laser projection engine design. Optical Engineering, Nov. 30, 2016, vol. 55, No. 11.

* cited by examiner

PROJECTION OBJECTIVE AND WAVEGUIDE DISPLAY DEVICE

FIELD OF THE INVENTION

The invention relates to projection objectives. In particular, the invention relates to a telecentric projection objective for augmented reality (AR) applications and the like.

BACKGROUND OF THE INVENTION

Recent interest in augmented reality applications and augmented reality systems has increased the number of different optical methods in achieving the overlap between projected image and the real background.

A specific type of display used in AR systems is a waveguide type display, where light is coupled in to a piece of glass or polymer in an in-coupling region and the light propagates therein within the total internal reflection limit angle until it is coupled out from the light guide at an out-coupling region. Ray splitting at the out-coupling region can effectively expand the eye box of the system at the cost of brightness.

Waveguide type displays can principally be split to two different groups. In the first group the projection objective exit pupil is expanded along one dimension only in the waveguide.

In the second group the projector exit pupil is expanded along two dimensions in the waveguide. The present invention relates in particular to the second group in which the requirements for the incoming light are stricter and which is therefore optically more challenging. For example, the exit pupil of the projector must be of certain diameter and close to the in-coupling grating of the waveguide, the projected beam of light must be highly collimated and telecentric.

Exit pupil expansion in the waveguide can be achieved in several ways, diffractive elements and partially reflective surfaces being the most common.

In practice, it is desirable in augmented reality applications that the total volume of the projection system is as small as possible. In general, many small-volume objective systems are known from the field of mobile phone camera technology. For example, U.S. Pat. Nos. 7,453,654, 7,502,181, 7,826,151, 7,965,455, 8,035,723 and 8,953,262 describe fixed focal length mobile phone camera objectives where the aperture stop is located between the object and second lens element, typically residing just in front of the first lens element to minimize the objective size. The compactness of these objectives requires the second lens element to be a negative lens element. In addition, telecentricity of these objectives is typically not very high. The mobile phone camera solutions are not as such applicable to the projection part of waveguide type displays and are in particular not capable of being used for expanding projector exit pupil along two dimensions in combination with diffractive gratings.

Thus, there is a need for improved projector objectives for waveguide displays.

SUMMARY OF THE INVENTION

It is an aim of the invention to solve at least some of the abovementioned problems and to provide a novel projection objective that can be used to couple light in to a waveguide which effectively expands the projector exit pupil along two dimensions.

A particular aim is to provide a projection objective that produces a collimated and telecentric enough beam for waveguide-based displays having a diffractive in-coupling grating. A further aim is to provide an objective, whose exit pupil can be brought close enough to the grating.

An aim is also to provide a projection objective, whose optics can be fitted in a small space.

The invention is based on providing a projection objective with a positive-negative-positive lens grouping with specific refractive surface configuration that allows for high telecentricity of the objective and collimation of light.

In more detail, the present projection objective is adapted to project an image from a first plane to a second plane, the objective comprising in order from the second plane a first optical element group having a positive effective focal length, a second optical element group placed between the first plane and the first optical element group and having a negative effective focal length, and a third optical element group placed between the first plane and the second optical element group and having a positive effective focal length. Each group comprises at least two refractive surfaces, typically in the form of lens surfaces. Counting refractive surfaces of the groups from the direction of the second plane, the first refractive surface of the second optical element group is concave towards the second plane and the second refractive surface of the third optical element group is convex towards the first plane.

It should be noted that although the optical element groups and surfaces are herein listed from the direction of the second plane towards the first plane, in projection applications herein discussed the light travels from the first plane towards the second plane.

The present waveguide display device comprises an optical waveguide having an in-coupling grating arranged thereto so as to diffract light hitting the in-coupling grating to the waveguide, and a projection objective of the present kind arranged to project an image from an image source to the in-coupling grating.

The in-coupling grating can be arranged at the second plane, which can also be the plane of the aperture stop of the projection objective. The projector is adapted to present the image to be projected on the first plane of the objective.

In particular, the projection objective has a projection exit pupil determined by its aperture stop (that is, there are no further imaging optics behind the aperture stop). The waveguide of the waveguide display may comprise means, in particular diffractive grating means, for expanding the projection exit pupil along two dimensions.

In particular, the invention is characterized by what is stated in the independent claims.

The invention offers significant benefits.

First, by means of the invention, it is possible to achieve a very compact projection objective capable of producing a collimated beam of projected light such that the exit pupil of the projection objective is close to the in-coupling grating of the waveguide.

In addition, the present optical configuration allows for manufacturing a telecentric or nearly projection objective, meaning that the maximum field of view chief ray arrives to the display nearly perpendicular. This has a remarkable positive effect on light engine efficiency.

The dependent claims are directed to selected embodiments of the invention.

Next, embodiments of the invention and advantages thereof are discussed in more details with reference to the attached drawings.

DESCRIPTION OF EMBODIMENTS

In the following discussion, various embodiments of the invention are introduced that allow keeping the objective size small, incorporating sufficient back focal length to the design and enforcing the telecentricity condition on the edge field rays.

Relative referrals, such as "before", "after", "first" and "last", unless otherwise apparent, are herein made with reference to the travel direction of light from the first plane (projector) towards the second plane (waveguide display). Optical element groups, optical elements therein and refractive surfaces are, however, numbered in the opposite order from the second plane towards the first plane.

Figure 1A:
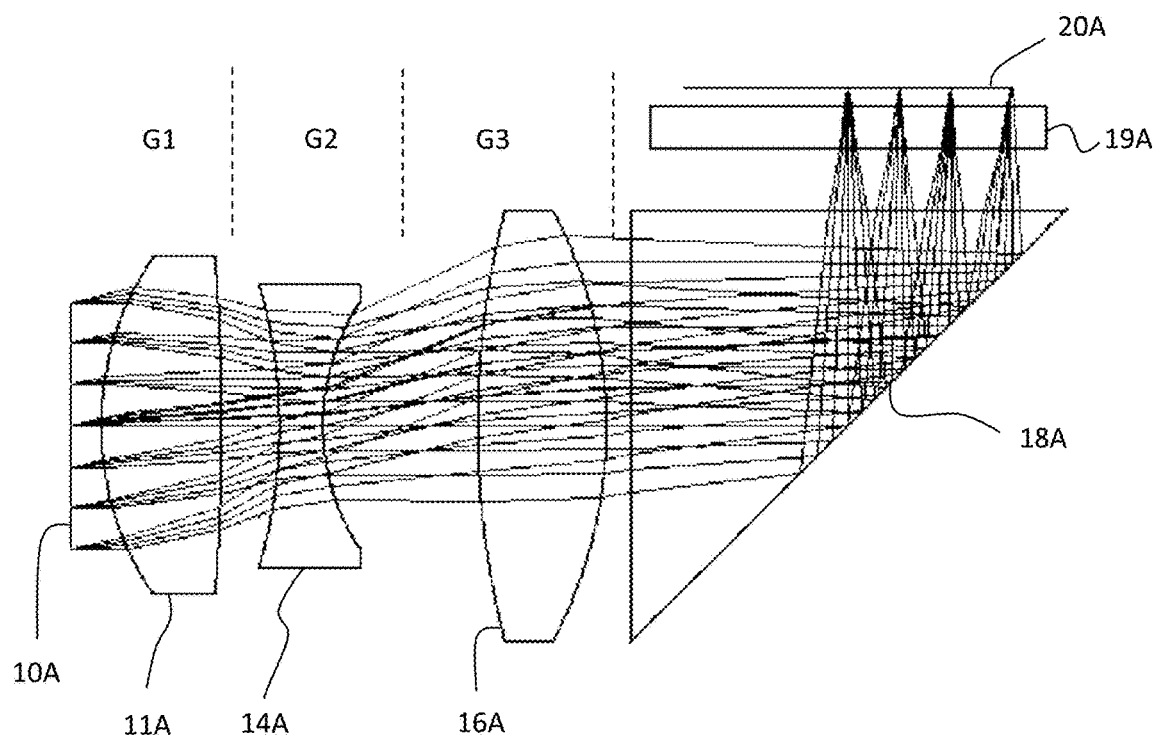
FIGS. 1A-1E show in cross-sectional views different embodiments of optics of the present objective.
Figure 1B:
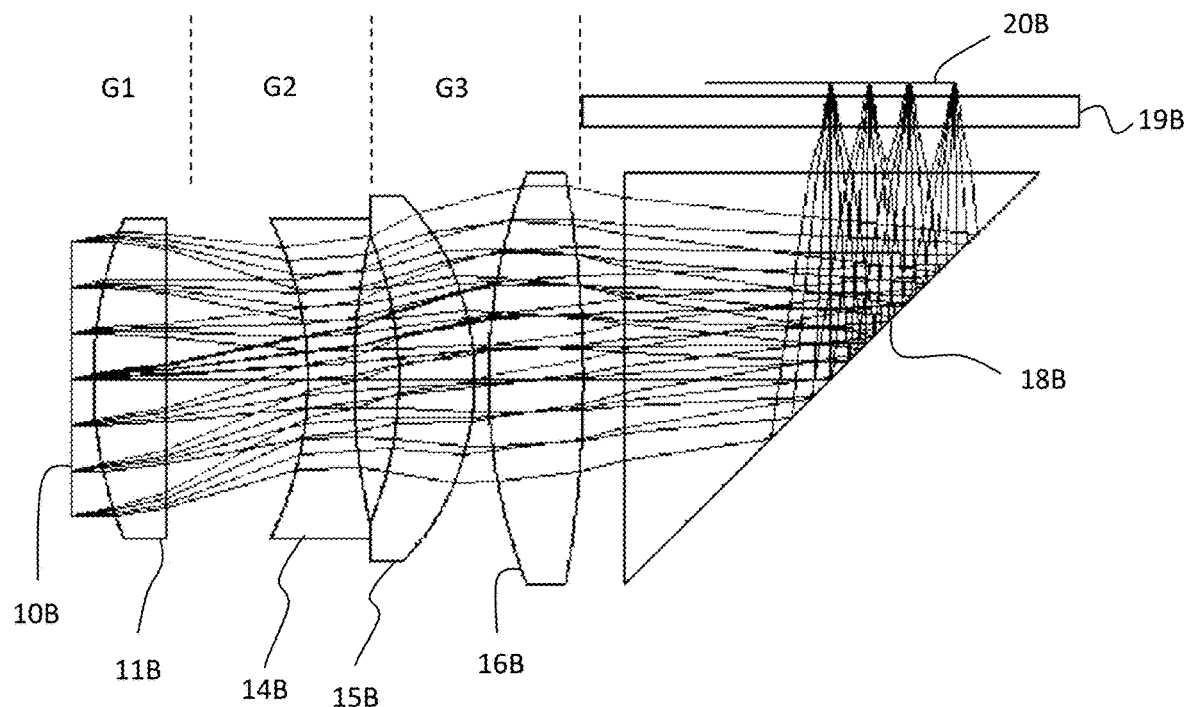

In embodiments of the present invention, the objective is divided into three groups, which may contain one or more optical elements, in particular lenses. The elements may or may not be aspherical. In FIGS. 1A 1E, the three groups are denoted with G1, G2 and G3, starting from the second plane. The second plane is denoted with reference numerals 10A 10E and the first plane with 20A 20E, respectively. The projector display (the object to be projected), such as an liquid crystal on silicon (LCOS) or digital light processing (DLP) display, is positioned at the first plane 20A 20E. A protective glass of the projector display is denoted with numerals 19A 19E. The in-coupling grating of the waveguide display is typically positioned at the second plane 10A 10E. From the in-coupling grating, light is coupled to a waveguide, in which it propagates via total internal reflections.

Generally speaking, the aperture stop of the objective is located at the second plane or between the second plane and the second optical element group G2, typically at the second plane or between the second plane and the first optical element group G1. In the illustrated examples, the plane of the aperture stop coincides with the second plane, where the in-coupling grating is positioned. In particular, the aperture stop resides after the lens elements of the first group G1, since this allows the use of a simple the in-coupling grating design.

The first element group G1, like the second and third groups G2, G3, may comprise a single lens element or two more lens elements together providing the required effective focal length for the group. Two or more elements may be attached to each other without air gap between the lenses in order to form a doublet or triplet, for example.

Figure 1C:
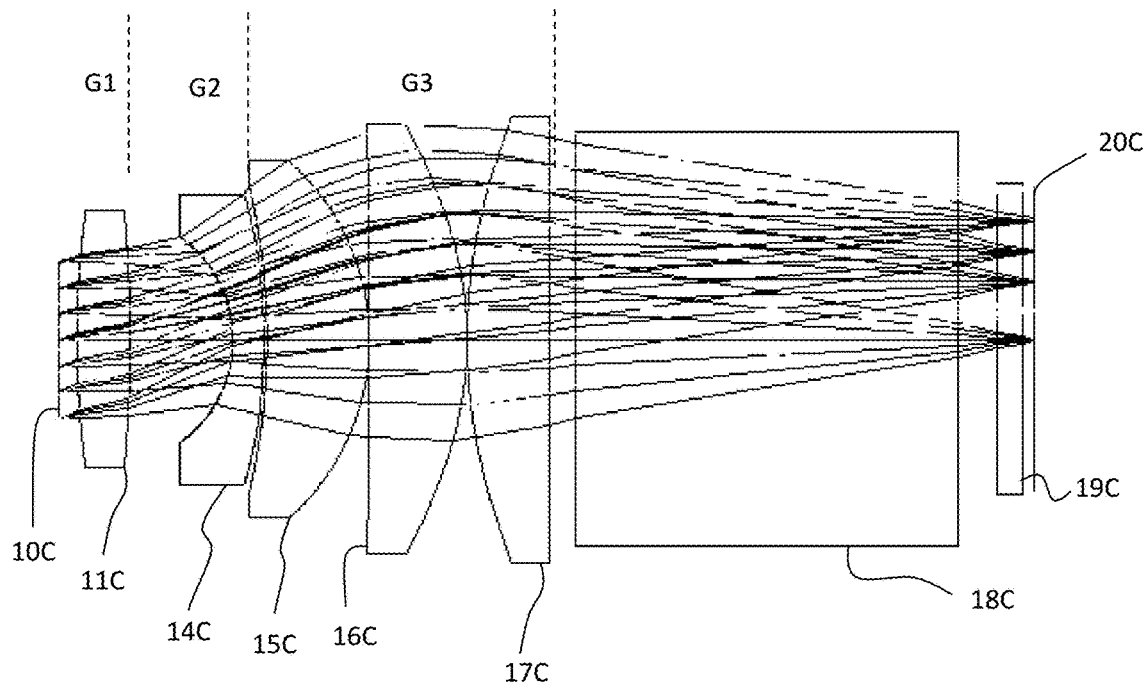
Figure 1D:
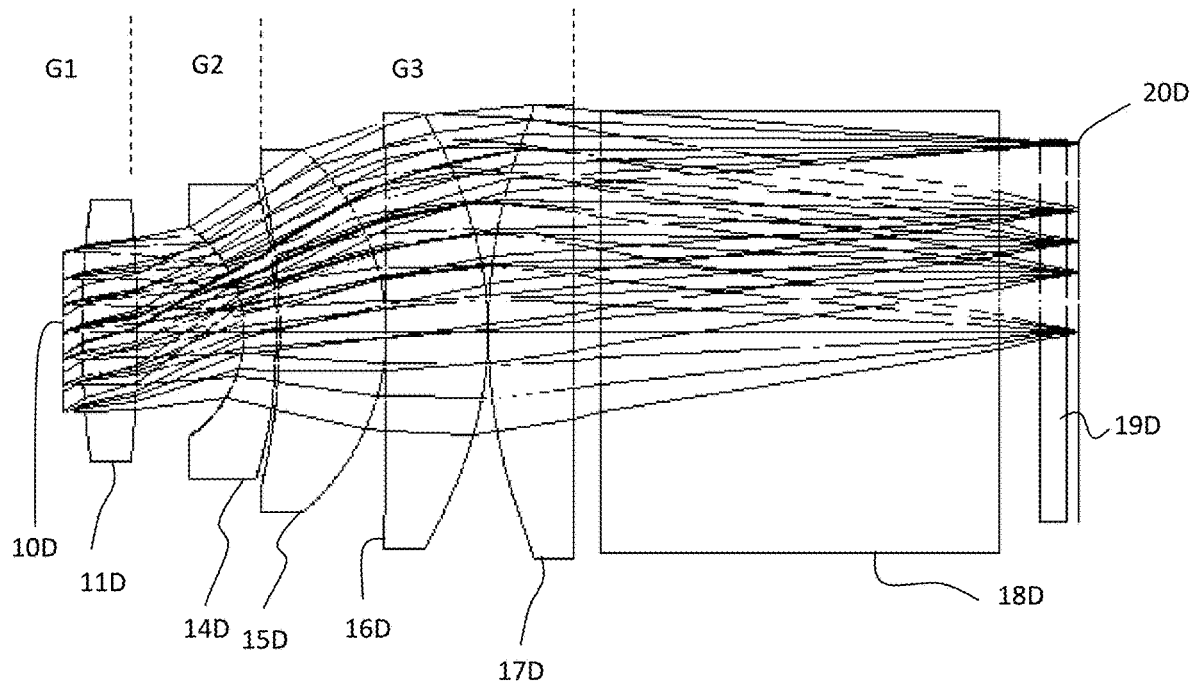
Figure 1E:
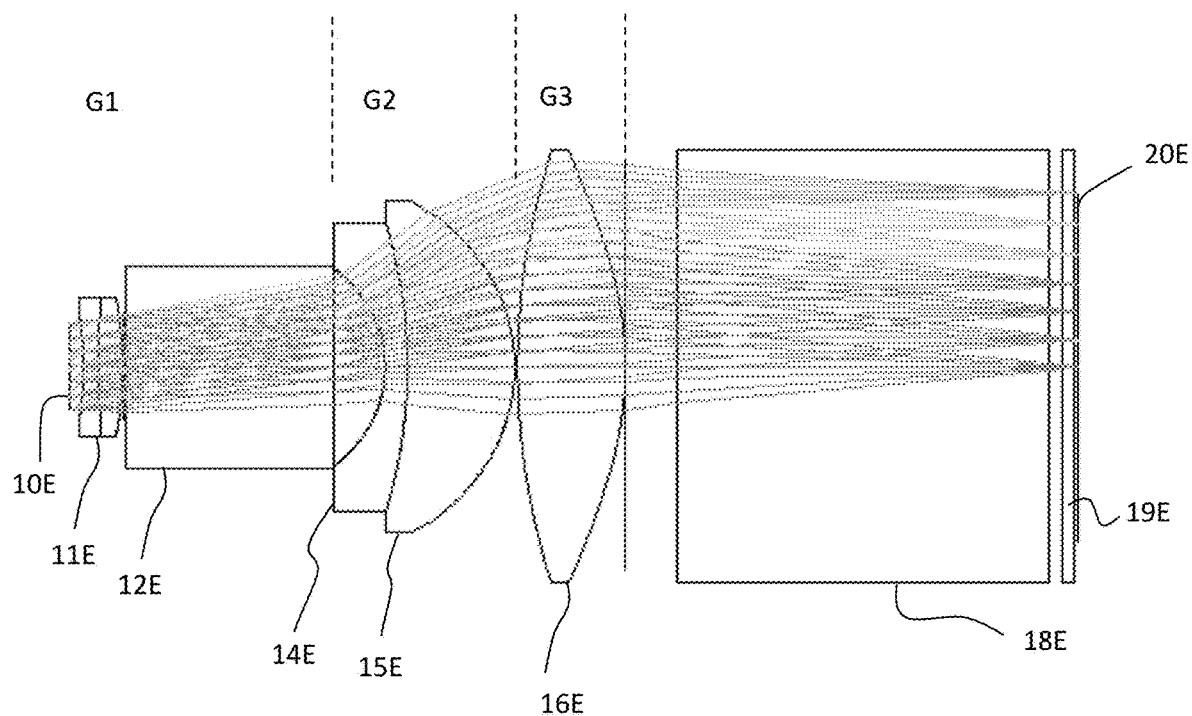

In the embodiments of FIGS. 1A, 1C and 1D, there is provided in the first group G1 a biconvex lens 11A, 11C, 11D. In the embodiment of FIG. 1B, the first group comprises a planoconvex lens 11B. In alternative embodiments, illustrated in FIG. 1E, instead of a biconvex or planoconvex lens, the first group G1, comprises or consists of a positive meniscus lens or lens doublet 11E.

There may be provided additional elements (not shown) in the first group G1, such as a prism. The additional elements may be on either or both sides of the lens or lens group 11A-11E, for example between the aperture stop at the second plane 10A 10E and the lens. In the embodiment of FIG. 1E, a prism schematically illustrated by a thick glass plate 12E, in positioned between the lens 11E and the second group G2. In some embodiments, there are no such additional elements, whereby the lens or lens group 11A 11E is the only element of group G1, and also the last element of the projection objective before the waveguide at the aperture stop.

The second group G2 contains negative refractive power lens element 14A 14E or a plurality of element together providing negative effective focal length. This group provides for the fastest expansion of the light rays, which together with the third positive group G3 satisfies the telecentricity requirement by intercepting the field chief rays approximately at the required image height. Thus, the negative lens spreads the beam of light within a short distance such that the chief ray is guided far from the optical axis and the positive group then refracts the beam so that it hits the in-coupling grating of the display element substantially at normal angle.

The first refractive surface of the second group G2 having a negative refractive power provides for greatest telecentric expansion in the shortest distance possible. It is also preferred that the second group G2 has an effective focal length that is shorter than the total focal length of the projection objective. Thus, the second optical element group G2 significantly contributes to the compactness of the projection objective. It should be noted that in the case of e.g. mobile phone camera lenses, there is no strict telecentricity requirement, whereby also the negative optical elements thereof have different kind of design, typically with the image side surface, instead of the object side surface, of the lens element having the greatest negative refractive power.

In the embodiments of FIG. 1A and FIG. 1B, the second group G2 consists of a biconcave lens 14A, 14B. In the embodiments of FIGS. 1C and 1D, the lens in this group G2 is a negative meniscus lens 14C, 14D. In the embodiment of FIG. 1E, the second group G2 consists of a doublet lens, herein more specifically a negative meniscus lens 14E and biconcave lens 15E doublet.

The third group G3 contains the remainder of necessary lens elements, together having a positive effective focal length, between the second group and a following prism or beam splitter assembly 18A 18E. Positive focal length allows for focusing the light rays once the divergence has been increased by the second group G2.

In some embodiments, the third group G3 comprises two or more lens elements, the first of which has two refractive surfaces, of which the second is convex towards the first plane and at least one of the other lens elements is a positive lens element, for example a planoconvex lens element or an aspherical lens element.

In the embodiments of FIGS. 1A and 1E, the third group G3 consists of one positive biconvex element 16A only. In the embodiment of FIG. 1B, there are provided two positive elements, i.e., a positive meniscus lens 15B and a biconvex lens 16B. In the embodiment of FIGS. 1C and 1D, there are provided a positive meniscus lens 15C; 15D followed by a lens pair 16C, 17C; 16D, 17D. This lens pair can be designed such that the first lens 16C; 16D has a higher refractive power. In particular, the third optical element group may comprise two or more lens elements, the first of which 16C; 16D has a refractive surface that is convex towards the first plane 20C, 20D. The second lens element 16C; 17D of the lens pair may have refractive surface that is convex towards the second plane 10C, 10D. One or both of lenses 16C, 17C; 16D, 17D can be an aspherical lens. This allows for correcting the wavefront for improving image quality (resolving power of the objective).

The arrangements of FIGS. 1C and 1D differ in that the size of the projection display is different. FIG. 1C represents a 50 degree system and FIG. 1D a 60 degree system.

Before the third optical element group G3, there may be provided, as element 18A 18E, a prism that expands the optical path of rays. A prism can be used in particular in the case of a DLP display. Due to the prism, the first plane 20A 20E can be at a right angle with respect to the optical axis of the element groups G1 G3. The prism is preferably the first element of the objective, whereby the distance between the prism and the projector display can be kept as short as possible.

In some embodiments, in particular those with an LCOS display, the element 18A 18E is a polarizing beam splitter, such as a beam splitter plate or cube.

The relatively large prism, beam splitter cube or a beam splitter mirror 18A 18E of the projection objective, typically covering the whole image area, is accommodated within the back focal length of the projection objective. This increases the back focal length requirement of the projection objective significantly from e.g. known mobile phone camera systems, which are optically not compatible with such arrangement.

In a preferred embodiment of the invention the following conditions are satisfied:
  The aperture stop is located after the second group G2, typically after the first group G1, in particular at the second plane, where the in-coupling grating of the waveguide display is positioned.
  The first group G1 has a positive effective focal length with the first refractive surface in this group being convex or concave towards the second plane (that is, towards the in-coupling grating of the waveguide display).
  The second group G2 has a negative effective focal length with the first refractive surface in this group being concave towards the second plane.
  The third group G3 has a positive effective focal length with the second refractive surface in this group being convex towards the first plane (that is, towards the projector display).

Figure 2:
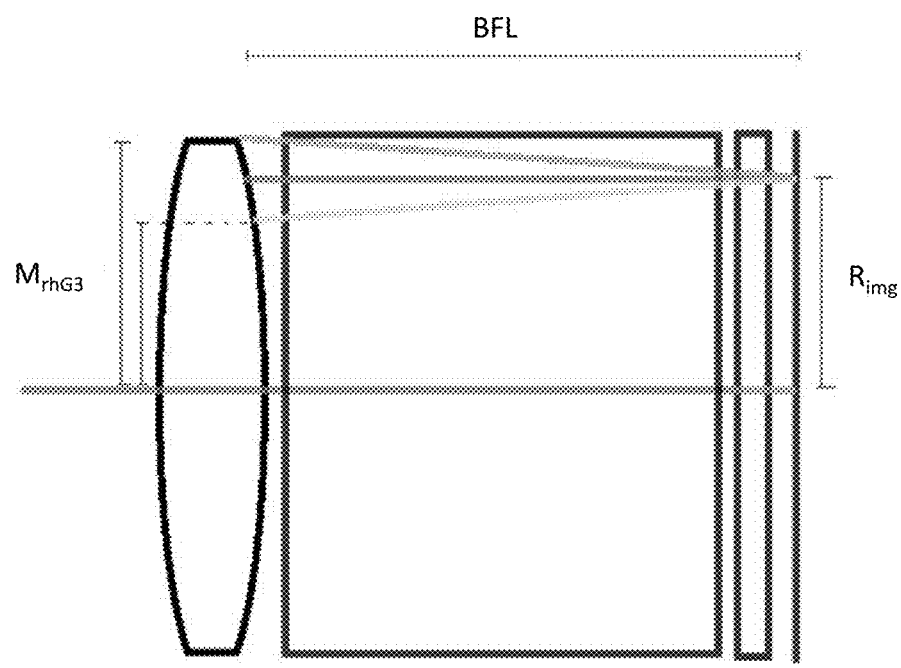
FIG. 2 illustrates the optical setup between the third optical element group and the first plane.

In further embodiments of the invention one or more of the following conditions are satisfied:
  The effective focal length $f_2$ of the second group G2 and the total effective focal length f of the objective satisfy: $|f_2/f|<0.7$ This allows for increasing the telecentricity of the objective and simultaneously keeping the objective small.
  The effective focal lengths of the second group G2 and the third group G3 satisfy: $0.3<|f_2/f_3|<1.5$
  This allows for focusing of the diverging beam coming from group G2 by group G3, while maintaining high telecentricity and useful size of the objective.
  The back focal length (BFL), herein defined as the distance between the third group G3 and the first plane, and the total effective focal length f of the objective satisfy $0.4<BFL/f<1.5$
  This ensures that the one can fit typically necessary additional elements, such as a beam splitter cube or prism, within the back focal length range. This increases the versatility of the objective to be used for example with liquid crystal on silicon (LCOS) projector displays, digital light processing (DLP) projector displays and organic LED (OLED) projector displays.
  Image diagonal radius $R_{img}$ and edge field marginal ray height exiting from the third group $M_{rhG3}$ satisfy: $R_{img}-BFL*0.44<M_{rhG3}<R_{img}+BFL*0.44$ This restricts the half opening angle of the first lens of the system to a range that is usable with DLP displays, for example, and allows for high efficiency and contrast. FIG. 2 illustrates the variables used herein (without an optional prism shown).

In some specific embodiments, the two last conditions are simultaneously satisfied. This ensures a sufficiently small but telecentric objective and a sufficiently collimated beam. In a further embodiment, all four conditions are simultaneously satisfied.

The present projection objective is particularly suitable to be used in personal microdisplays, such as near-to-eye displays (NEDs) or other head mounted displays (HMDs). In particular, the objective suits for augmented reality (AR) NEDs or HMDs, in which diffractive waveguides are used for image formation and the projector and its optics must be fitted in a very small space. In some embodiments, the present objective is assembled in an eye-glass format display device, in particular a temple thereof, and optically coupled with an image formation device and an the waveguide of the display. Generally, in AR applications, the waveguide comprises a transparent light guide comprising, in addition to the in-coupling grating, an out-coupling grating and allowing the user to simultaneously see through the display and view the projected image.

CITATIONS LIST

Patent Literature

U.S. Pat. No. 7,453,654
U.S. Pat. No. 7,502,181
U.S. Pat. No. 7,826,151
U.S. Pat. No. 7,965,455
U.S. Pat. No. 8,035,723
U.S. Pat. No. 8,953,262

The invention claimed is:

1. A projection objective for projecting an image from a first plane to an in-coupling grating of a waveguide element on a second plane, the objective comprising in order from the second plane:
  a first optical element group having a positive effective focal length,
  a second optical element group placed between the first plane and the first optical element group and having a negative effective focal length, and
  a third optical element group placed between the first plane and the second optical element group and having a positive effective focal length,
wherein said optical element groups have refractive surfaces such that in order from the second plane
  the first refractive surface of the second optical element group is concave towards the second plane, and
  the second refractive surface of the third optical element group is convex towards the first plane,
the objective comprising an aperture stop, which is located at the second plane or between the second plane and the first optical element group, and
wherein the objective is adapted to collect an image radius of $R_{img}$ from the first plane, wherein an edge field marginal ray height from the third optical element group ($M_{rhG3}$) satisfies the condition of $$R_{img}-BFL*0.44<M_{rhG3}<R_{img}+BFL*0.44,$$

wherein BFL is the back focal length (BFL) between the third optical element group and the first plane, measured in air.

2. The objective according to claim 1, wherein the first refractive surface of the first optical element group is convex towards the second plane.

3. The objective according to claim 1, wherein the first refractive surface of the first optical element group is concave towards the second plane.

4. The objective according to claim 1, wherein the second optical element group comprises or consists of a negative lens doublet, such as a negative meniscus-biconvex lens doublet.

5. The objective according to claim 1, comprising a prism or beam splitter between the third optical element group and the first plane.

6. The objective according to claim 1, wherein the effective focal length of the second optical element group ($f_2$) is less than the effective total focal length of the objective (f).

7. The objective according to claim 1, wherein the absolute value of the ratio of the effective focal length of the second optical group ($f_2$) to the effective focal length of the third optical element group ($f_3$) is between 0.3 and 1.5.

8. The objective according to claim 1, wherein the ratio of the back focal length of the objective (BFL) between the third optical element group and the first plane, measured in air, to the effective total focal length of the objective (f) is between 0.4 and 1.5.

9. The objective according to claim 1, wherein the third optical element group comprises two or more lens elements, the first of which having said second refractive surface that is convex towards the first plane and at least one of the other lens elements is a positive lens element.

10. A waveguide display device comprising:
an optical waveguide,
an in-coupling grating arranged at the waveguide so as to diffract light hitting the in-coupling grating to the waveguide, and
a projection objective arranged to project an image from an image source to the in-coupling grating,
wherein the projection objective is an objective according to claim 1 and the optical waveguide comprises diffractive means for expanding a projection exit pupil along two dimensions.

11. The waveguide display device according to claim 10, wherein the in-coupling grating is arranged at the second plane of the projection objective.

12. The waveguide display device according to claim 10, further comprising a means for presenting an image on the first plane of the projection objective.

13. The waveguide display device according to claim 10, wherein the waveguide further comprises an out-coupling grating optically connected with the in-coupling grating for displaying the projected image.

14. The waveguide display device according to claim 10, wherein the waveguide display device is a wearable personal display device, in particular a head-mounted display (HMD) device, such as a near-to-eye display (NED) device.

15. The objective according to claim 1, comprising a prism or beam splitter as the first element of the objective.

16. The objective according to claim 1, wherein the absolute value of the ratio of the total focal length to the focal length of the second optical element group is less than 0.7.

* * * * *